W. H. WASH.
Smut and Wheat Separating Machine.
No. 111,794. Patented Feb. 14, 1871.
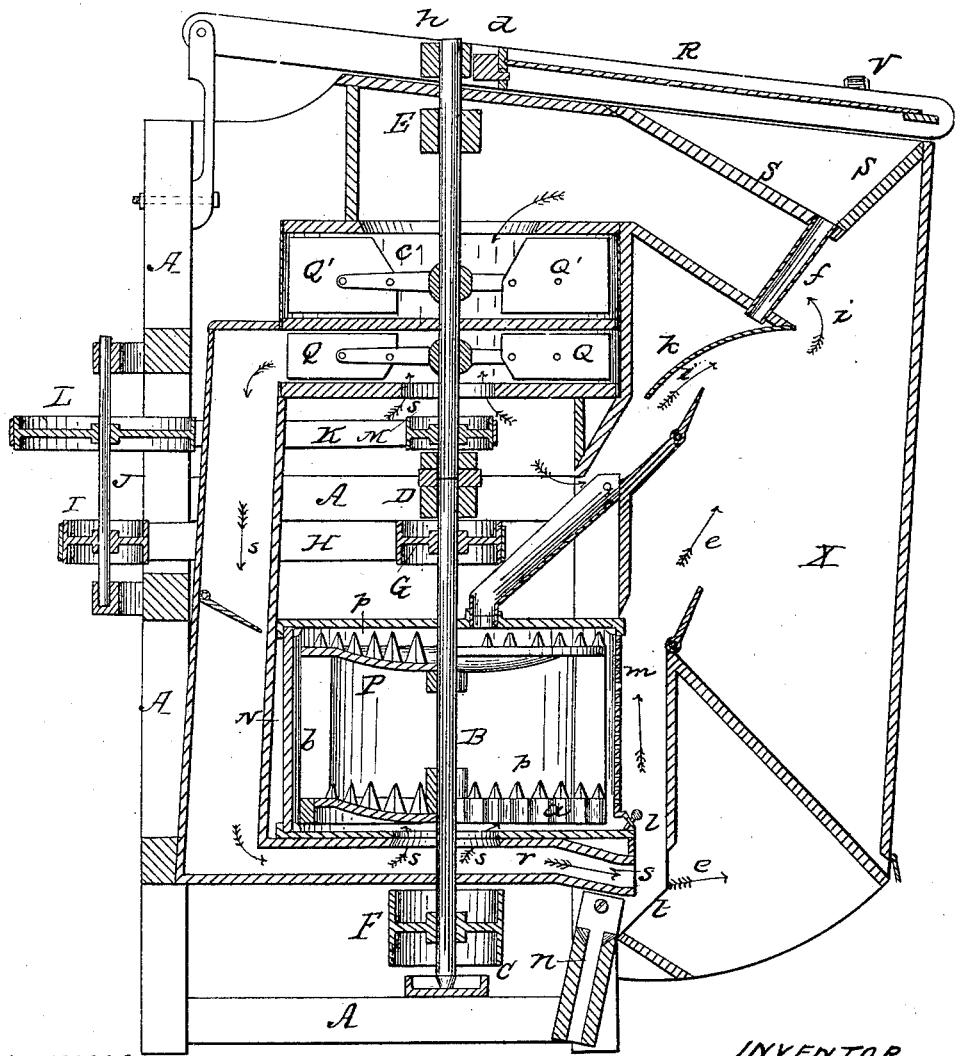
WITNESSES
INVENTOR

United States Patent Office.

WILLIAM H. WASH, OF HOWARDSVILLE, VIRGINIA.

Letters Patent No. 111,794, dated February 14, 1871; antedated February 1, 1871.

IMPROVEMENT IN SMUT AND WHEAT-SEPARATING MACHINES.

The Schedule referred to in these Letters Patent and making part of the same.

*To all whom it may concern:*

Be it known that I, WILLIAM H. WASH, of Howardsville, in Albemarle county and State of Virginia, have invented certain new and useful Improvements in "Smut and Wheat-separating Machines;" and I do hereby declare that the following is a full, clear, and exact description thereof, reference being had to the accompanying drawing through letters of reference marked thereon forming part of this specification, and which represents a central vertical section of my machine.

The object of my invention is the more thoroughly to clean the grain and separate from it the smut and other impurities; and It consists—

First, in the arrangement of a continuous vertical operating-shaft in two parts, driven at different velocities.

Second, in the combination of a blast and an exhaust-fan, with the beater or disks so arranged and operating as that the latter shall exhaust from the beater-chamber the air forced in by the blast-fan, and thus reinforce its otherwise gradually failing velocity.

Third, in the arrangement of a self-adjusting valve, whereby the discharge of the grain from the beater into the air-passage is more evenly distributed, and its discharge from the lower portion of the cylinder is partially arrested.

Fourth, the arrangement of the convex or curved chute to insure the delivery of the grain in a thin flat sheet to be acted on by the blast in its passage to the beater-cylinder, all as hereinafter more particularly described.

To enable others to make and use my invention, I will describe its construction and operation by referring to the drawing, in which—

A represents the frame of the machine, in which is arranged a vertical shaft, B, revolving in a step, C, at its lower end, and a collar or sleeve, D, at its upper end.

In line with this shaft, and what may be termed an extension of it, is another shaft, B', revolving in the same sleeve D, at its lower end, and in a suitable bearing, E, at its upper end.

These shafts receive their motion from any suitable driving-power, the lower one through the pulley F, which, in turn, communicates motion at a greater velocity by means of a belt, H, around the pulley G at its upper end, and pulley I on the counter-shaft J; thence, by belt K, around the pulley L on the counter-shaft, and pulley M on the lower end of the shaft B'.

Around the shaft B is a cylinder or casing, N, in which is the beater P, secured on said shaft so as to rotate with it. This beater consists of two heads, P¹ P², of concave form on their upper sides, which are studded with prongs $p$ of pyramidal form. The lower head P² is also ribbed or corrugated around its periphery, as shown at $a$. The concavities of these heads, with their prongs $p$ and ribbed periphery of the lower one, are designed to obtain the largest amount of heating surface within a cylinder of moderate size. These two heads P¹ and P² are also provided with vertically-arranged paddles or blades $b$, which extend from one to the other, and are set radially around the axis, or nearly so.

On the upper shaft B', and within the chambers $c$ $c'$, are secured the fans Q Q', the former being of somewhat smaller dimensions than the latter, for the reasons hereinafter set forth.

A screen, R, is arranged at the upper part of the apparatus, over a hopper or chute, S, and is pivoted at its one end to springing standards T, and sustained at its opposite end by straps or other flexible material, V, in such manner that said end may be raised or lowered to vary the inclination of the screen. A shaking motion is communicated to it by an eccentric, $h$, on the upper end of the shaft B', revolving in contact with a block, $d$, on the screen.

In the bottom of the hopper S is a series of spouts, $f$, through which the grain, after it has been freed of stones and sticks or other coarse refuse by the screen, passes down onto a curved metal incline, $k$, and in passing over this curve it becomes spread into a thin sheet, and thence falls through a current of air passing as indicated by the arrows $e'$ $e'$, when the heavier portion will fall down the chute W into the beater-cylinder N, while that of inferior quality will be drawn by the air into the chamber X, where the dust is separated from it, leaving all that is too heavy to be raised by the air-current to deposit at the bottom of said chamber and pass out through the valve $g$.

The grain that has passed down chute W into the cylinder N is subjected to a beating and rubbing process by the prongs $p$, beaters $b$, and ribbed portions $a$ of the revolving beater P, and passes out through the self-closing valve $l$, which is weighted to require a given pressure of air to open it, while the dust and scourings separated in the cylinder N are carried by the blast through the screen $m$, in direction of the arrows $e$, through the chamber X. The grain, in discharging through the valve $l$ to the chute $n$, is subjected to another current of air from the blast-passage $r$, which carries all small particles, such as gravel, sand, or cockle, through the screen $t$, while the cleaned grain passes down through said chute $n$.

From the above description it will be seen that the grain, in its passage through the machine, is subjected to the action of a blast-fan, Q, and a vacuum-fan, Q', operating at the two ends of a continuous air-passage through the entire apparatus, by which an equal velocity of the current may be maintained in its passage through the machine from its ingress on the under side of the blast-fan Q to its egress on the periphery of the exhaust or vacuum-fan Q', and, the several passages through which such current of air passes being controlled by valves $v$ $v^1$ $v^2$, its force may be equalized or adjusted as desired at every point where the grain is subjected to its action.

The several currents of air, which may be termed supply and exhaust, are indicated by the arrows marked $s$, $e$, and $e'$.

Having thus fully described my improved machine, What I claim as new, and desire to secure by Letters Patent, is—

1. The arrangement of the main shafts B B, in combination with the counter-shaft J and their respective pulleys and bands, for operation substantially as set forth.

2. The arrangement of the blast and exhaust-fans Q and Q' and their respective air-passages with relation to the beater P and separator X, in such manner that the blast from the fan Q is taken up and discharged by that Q', as shown and described.

3. The arrangement of the weighted valve $l$ at the grain-exit of the cylinder N, to prevent the escape of grain except under a pressure of air sufficient to open said valve, as specified.

4. The arrangement of the convex or curved chute $k$ beneath the hopper, whereby the grain from the tubes $f$ is delivered to the air-blast in a thin broad sheet, as described.

In testimony whereof I hereunto set my hand before two subscribing witnesses this 23d day of March, 1870.

WM. H. WASH.

Witnesses:
 N. H. HOTCHKISS,
 J. R. LAMSON.